United States Patent [19]

Moessner

[11] Patent Number: 5,523,563

[45] Date of Patent: Jun. 4, 1996

[54] APPARATUS FOR CONTROLLING THE TEMPERATURE OF A NEAR-INFRARED ANALYZER

[75] Inventor: Richard C. Moessner, Midlothian, Va.

[73] Assignee: E. I. Du Pont de Nemours and Company, Wilmington, Del.

[21] Appl. No.: 289,554

[22] Filed: Aug. 12, 1994

[51] Int. Cl.[6] .............................. G01N 21/35; F25B 9/00
[52] U.S. Cl. ................. 250/238; 250/352; 62/5; 62/259.2
[58] Field of Search ................................. 250/238, 239, 250/216, 339.03, 339.07, 339.11, 341.1, 341.8, 352, 339.2, 339.1, 340, 341.6, 370.15; 62/5, 90, 96, 119, 168, 173, 259.2, 263

[56] References Cited

U.S. PATENT DOCUMENTS

| | | | |
|---|---|---|---|
| 5,010,736 | 4/1991 | York et al. | 62/5 |
| 5,046,018 | 9/1991 | Flewelling et al. | 364/497 |
| 5,422,483 | 6/1995 | Ando et al. | 250/339.02 |

FOREIGN PATENT DOCUMENTS

3707320A1  3/1987  Germany.

OTHER PUBLICATIONS

W. G. Fateley et al, The Tenets for Using Electromagnetic Radiation in Analytical and Structrual Chemistry, *CPAC Informational Document Announcement*#53, 1–28, Aug. 9, 1994.

Roger E. Schirmer, Remote Optical Monitoring of Polymer Processing Over Long Fiber Optic Cables, *Guided Wave*, 28, No. 2, 65–69.

*Primary Examiner*—Stephone Allen
*Assistant Examiner*—John R. Lee

[57] ABSTRACT

A preferred temperature control strategy was devised to remove heat from the analyzer and control the optical bench temperature continuously at aim. A foil-type RTD temperature detector is fastened to the optical bench to serve as a measurement input device for a PID control strategy, which is truly aim-seeking. The control strategy employs a heat pipe technology to remove heat from the analyzer enclosure. A heat pipe utilizes a fluid (such as an alcohol) to remove heat by evaporation of the fluid at an internal air circulation heat exchanger and then recondensing the fluid at an external air circulation heat exchanger. The PID temperature controller achieves the desired temperature setpoint by manipulation of heat exchanger fan speeds. The heat removal rate can be very precisely controlled. In practice, both heat exchanger fans could be controlled together; however, to achieve optimal internal temperature uniformity, the internal heat exchanger fan is maintained at full speed and just the external fan is controlled to adjust heat removal rate. Optical bench temperature control is maintained to plus or minus 0.1 degree C. vs. a typical temperature control band of plus or minus 2 degrees C.

5 Claims, 1 Drawing Sheet

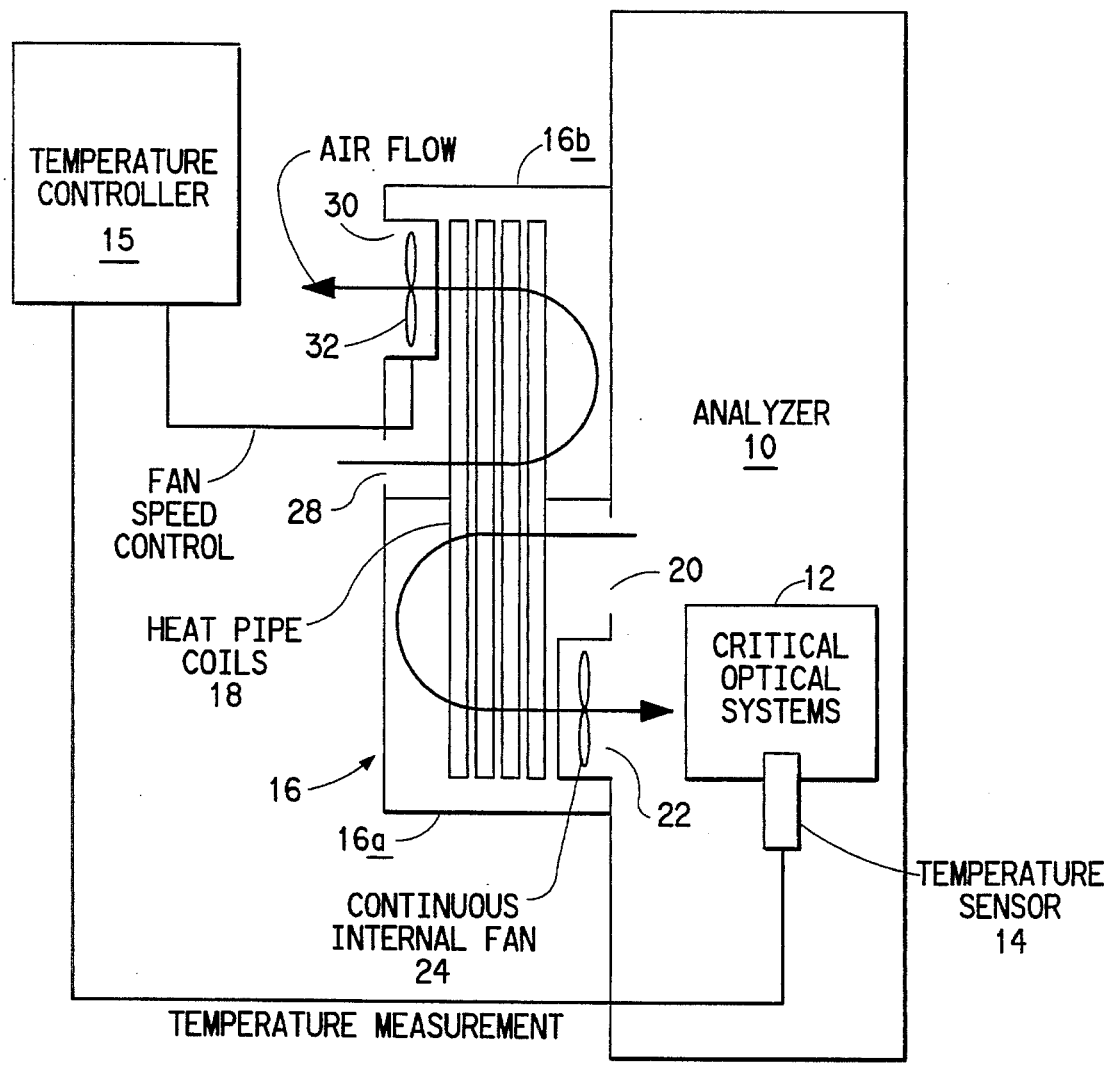
FIGURE

APPARATUS FOR CONTROLLING THE TEMPERATURE OF A NEAR-INFRARED ANALYZER

BACKGROUND OF THE INVENTION

The invention relates to thermal management in instrumentation and more particularly it relates to temperature control of a near-infrared analyzer.

Thermal management in instrument packaging has always been an important design consideration. Internal temperature control of near-infrared (NIR) analyzers is essential for measurement precision. More particularly, NIR spectrophotometers can be affected by temperature variations as little as 2 to 4 degrees C., which cause shifting of optimal wavelengths, and the addition of error in the measurement.

The typical process spectrophotometer is controlled within a band of temperature by utilization of an on-off type control strategy. In the "on" state, a condenser or other device is turned on to remove heat build-up from within the spectrophotometer enclosure. The condenser or other device remains "on" until a low temperature limit is reached and then the condenser is turned "off." The temperature in the spectrophotometer enclosure rises from the heat generated by the electronics and/or the external environment until a second temperature limit is reached, which causes the condenser or other device to be turned "on" again. This on/off temperature control approach commonly allows the internal temperature to cycle 2–4 C. degrees.

SUMMARY OF THE INVENTION

A preferred temperature control strategy was devised to remove heat from the analyzer and control the optical bench temperature continuously at aim. A temperature sensor is fastened to the optical bench in an analyzer to serve as a measurement input device for a control strategy which is truly aim-seeking. The control strategy employs a heat pipe heat exchanger to remove heat from the analyzer enclosure. A heat pipe utilizes a fluid (such as an alcohol) to remove heat by evaporation of the fluid at an internal air circulation heat exchanger and then recondensing the fluid at an external air circulation heat exchanger. Heat pipes are particularly useful in that internal cabinet air, not outside air, is circulated through the critical optical components, thereby eliminating the need for additional filtering of the cooling air.

A PID temperature controller achieves the desired temperature setpoint by manipulation of heat exchanger fan speeds. The heat removal rate can be very precisely controlled, In practice, both heat exchanger fans could be controlled together; however, to achieve optimal internal temperature uniformity, the internal heat exchanger fan is maintained at full speed and just the external fan is controlled to adjust heat removal rate. Optical bench temperature control is maintained to plus or minus 0.1 degree C. vs. a typical temperature control range of plus or minus 2 degrees C.

More particularly, the invention includes an apparatus and a process for controlling the temperature of an analyzer cabinet wherein heat is generated within the cabinet. The apparatus comprises a heat exchanger having internal and external chambers surrounding heat pipe coils attached to the analyzer cabinet. The internal side chamber is in communication with the cabinet via an inlet and an outlet; a continuously operating constant speed fan located in the inlet is provided for circulating air past the coils and through said cabinet. The external chamber is in communication with fresh outside ambient air and a variable speed fan circulates outside ambient air through the external chamber. A temperature sensor located in the cabinet produces signals corresponding to the temperature at the sensor location. The variable speed fan is responsive to the signals produced by the sensor.

The other embodiment of this invention is an improved process for controlling the internal cabinet temperature of a near-infrared analyzer, and therefore, the accuracy of the analyzer. This improvement comprises continuously measuring the temperature of the critical optical components in the cabinet, and, in response, continuously circulating temperature-controlled air by these critical optical components to maintain the components at a relatively constant temperature. By use of this process, the temperature of the temperature-sensitive critical optical components can be maintained to plus or minus 0.1 degree C.

BRIEF DESCRIPTION OF THE DRAWING

The FIGURE is a schematic illustration of an analyzer and associated internal and external heat exchangers.

DETAILED DESCRIPTION OF THE PREFERRED EMBODIMENT

Referring to the FIGURE analyzer cabinet 10 contains critical optical systems 12, in addition to electrical components (not shown). "Critical optical systems" or "critical optical components" are meant to include photodetectors, gratings, grating mounts, etc., which are temperature sensitive and are normally housed inside the analyzer cabinet in what is called an "optical bench." Temperature sensor 14 is attached to the critical optical systems and outputs a temperature signal to temperature controller 15. Also, attached to analyzer cabinet 10 is a heat pipe heat exchanger 16, having an internal side 16a, an external side 16b, and heat pipe coils 18. The heat pipe coils extend from the internal side to the external side so that heat may be transferred from the internal side to the external side. In addition, the internal side has an internal inlet 20 for removing air from the analyzer cabinet, and an internal outlet 22 for providing temperature-controlled air to the critical optical systems. A continuously operating internal fan 24 is mounted in the internal outlet 22 to provide movement of air through the internal side of the heat pipe heat exchanger. The external side 16b of the heat pipe heat exchanger has an external inlet 28 for providing fresh outside ambient air to the heat-pipe heat exchanger, and an external outlet 30 for removing this air from the external side. A speed-controlled fan 32 is mounted in the external outlet 30 to provide movement of air through the external side of the heat pipe heat exchanger 16. The speed controlled fan 32 is electrically connected to the temperature controller 15, and the speed of the fan increases or decreases based on the output signal from the temperature sensor 14, thus providing more or less cooling to the heat pipe coils 18 in heat exchanger 16.

In one example of a preferred construction, a Noren Model CC600F heat pipe heat exchanger containing interior and exterior fans (supplied by Noren Products, Inc., Menlo Park, Calif.) was attached to the enclosure of a Guided Wave 300P Near-Infrared Analyzer (supplied by UOP Guided Wave, El Dorado Hills, Calif.). A Minco foil-type 100 ohm Resistance Temperature Detector, or RTD, was attached to critical optical components in the analyzer and inputted signals to a ECS Model 6415 PID temperature controller having a 10 amp control output. This output was in turn connected to the external fan of the heat pipe heat exchanger for control of the external fan speed.

What is claimed is:

1. An apparatus for continuously controlling to within plus or minus 0.1° C. the temperature of an analyzer cabinet having critical optical components wherein heat is generated within said cabinet, said apparatus comprising: a heat exchanger having internal and external chambers surrounding heat pipe coils, said heat exchanger attached to said analyzer cabinet; said internal chamber being in communication with said cabinet by means of an inlet and an outlet; a continuously operating constant speed fan located in said inlet for circulating air past said coils and through said cabinet; said external chamber being in communication with fresh outside ambient air; and a variable speed fan circulating outside ambient air through said external chamber; a temperature sensor located on the critical optical components within said analyzer cabinet; said sensor producing signals corresponding to the temperature at the sensor location; and said variable speed fan being responsive to said signals.

2. The apparatus of claim 1, wherein the critical optical components are of the group consisting of a photodetector, a grating, and a grating mount.

3. In the process for controlling at an aim point within plus or minus 0.1° C. the temperature of near-infrared analyzer critical optical components housed within a cabinet having attached a heat exchanger having internal and external chambers surrounding coils wherein the internal chamber communicates with the cabinet via an inlet and outlet wherein a continuously operating constant speed fan circulates air past the coils and through the chamber and the external chamber communicates with fresh, outside ambient air via an inlet and outlet having a variable speed fan, the improvement comprising:

a) continuously measuring the temperature of the critical optical components in cabinet by means of a temperature sensor fastened to the critical components;

b) continuously circulating air by means of the constant speed fan past the critical optical components to maintain the components at a relatively constant temperature; and, c) controlling the speed of the variable speed fan from signals generated by the temperature sensor.

4. The process of claim 3, wherein the critical optical components are of the group consisting of a photodetector, a grating, and a grating mount.

5. The process of claim 3, wherein the temperature of the critical optical components is maintained to plus or minus 0.1 degrees C.

* * * * *